United States Patent
Turner

(10) Patent No.: US 8,431,237 B2
(45) Date of Patent: Apr. 30, 2013

(54) ELECTRODE

(75) Inventor: John Thomas Turner, Krugersdorp (ZA)

(73) Assignees: Thomas John Meyer, Krugersdorp (ZA); John Thomas Turner, Krugersdorp (ZA)

( * ) Notice: Subject to any disclaimer, the term of this patent is extended or adjusted under 35 U.S.C. 154(b) by 597 days.

(21) Appl. No.: 11/989,880

(22) PCT Filed: Jul. 28, 2006

(86) PCT No.: PCT/IB2006/002065
§ 371 (c)(1),
(2), (4) Date: Aug. 18, 2009

(87) PCT Pub. No.: WO2007/015131
PCT Pub. Date: Feb. 8, 2007

(65) Prior Publication Data
US 2010/0040901 A1    Feb. 18, 2010

(30) Foreign Application Priority Data

Aug. 1, 2005    (ZA) ................................. 2005/06108
Aug. 19, 2005    (ZA) ................................. 2005/06663

(51) Int. Cl.
*B32B 15/00* (2006.01)
*B32B 15/04* (2006.01)
*B32B 15/20* (2006.01)

(52) U.S. Cl.
USPC ........... 428/600; 428/602; 428/644; 428/213; 428/645; 428/674

(58) Field of Classification Search .................. 428/600, 428/602, 644, 213, 212, 615, 643, 645, 674
See application file for complete search history.

(56) References Cited

U.S. PATENT DOCUMENTS

| | | | |
|---|---|---|---|
| 1,960,002 A | | 5/1934 | Eppensteiner |
| 3,853,626 A | * | 12/1974 | Daniels et al. ........................ 29/2 |
| 4,535,040 A | * | 8/1985 | Kline ............................. 429/234 |
| 5,172,850 A | * | 12/1992 | Prengaman et al. ........... 228/176 |

FOREIGN PATENT DOCUMENTS

| | | | |
|---|---|---|---|
| EP | 0 348 702 A | | 1/1990 |
| JP | 59-023471 | * | 2/1984 |
| JP | 59 157962 A | | 9/1984 |
| JP | 02-037667 | | 2/1990 |
| WO | WO 00/42241 | * | 7/2000 |

OTHER PUBLICATIONS

Prengaman, in "The metallurgy and performance of cast and rolled lead alloys for battery grids," in J. Power Sources, 67 (1997, no month), pp. 267-278.*

Translation, JP Sekiguchi 59-023471, Feb. 1984.*

* cited by examiner

*Primary Examiner* — Michael La Villa
(74) *Attorney, Agent, or Firm* — Nelson Mullins Riley & Scarborough LLP; Anthony A. Laurentano

(57) ABSTRACT

A method of forming an electrode includes casting a molten metal in a mould to form an electrode with a header portion and a blade portion. The blade portion of the electrode is then rolled after it has been cast. The blade portion may be rolled into at least two different thicknesses. In one embodiment the metal is lead or lead alloy and the method relates to the forming of a lead or lead alloy anode.

7 Claims, 1 Drawing Sheet

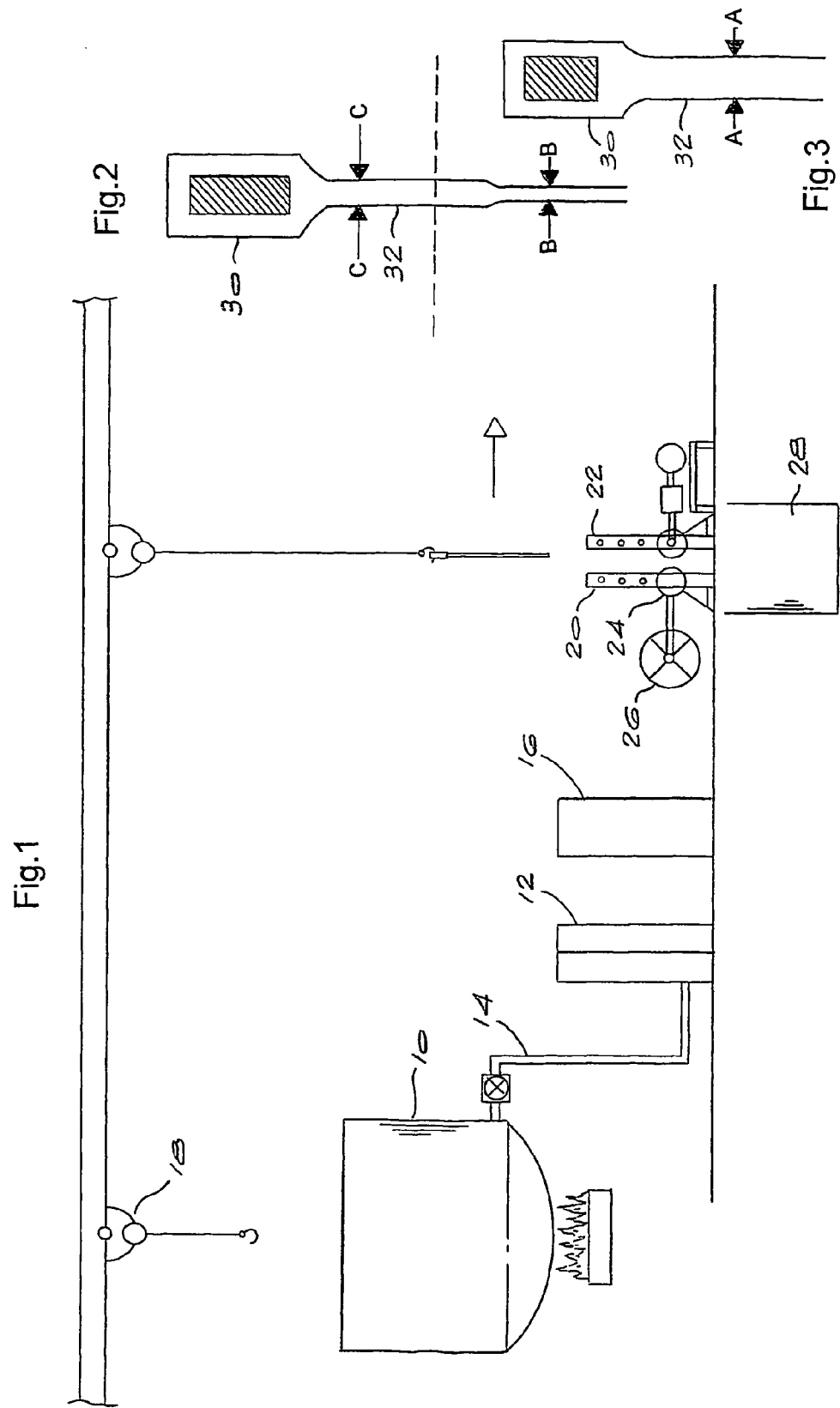

ELECTRODE

RELATED APPLICATIONS

This application is a 35 U.S.C. 371 national stage filing of International Application No. PCT/IB2006/002065, filed 28 Jul. 2006, which claims priority to South African Patent Application Nos. 2005/06108 filed on 1 Aug. 2005 and 2005/06663 filed on 19 Aug. 2005 in South Africa. The contents of the aforementioned applications are hereby incorporated by reference.

BACKGROUND OF THE INVENTION

This invention relates to an electrode and to a method for forming an electrode, typically a lead alloy anode.

Previously, electrodes were cast from a metal and had to be formed with a thicker blade for rigidity and corrosion resistance as cast metal, such as cast lead, typically corrodes faster than rolled metal.

Later developments have seen the manufacturing of the electrode by casting the header of the electrode and rolling the blade with the blade then being welded to the head.

However, this is relatively more difficult to manufacture. The invention seeks to address this.

SUMMARY

According to one example embodiment a method of forming an electrode includes:

casting a molten metal in a mould to form an electrode with a header portion and a blade portion; and rolling the blade portion of the electrode after it has been cast.

The method may include the rolling of the blade portion into at least two different thicknesses.

The method may also include inserting a second metal into the mould before the molten metal is cast into the mould.

The second metal may be copper.

In one aspect the metal is lead or lead alloy and the method relates to the forming of a lead or lead alloy anode.

The invention also extends to an electrode including:

a cast header portion; and a rolled blade portion integrally formed with the header portion.

The blade portion has at least two different thicknesses.

The electrode may include a second metal moulded with the electrode.

The second metal may be copper.

In one example, the electrode is formed from lead or lead alloy and is a lead or lead alloy anode.

BRIEF DESCRIPTION OF THE DRAWINGS

FIG. 1 shows an example plant for manufacturing electrodes according to one aspect;

FIG. 2 shows a schematic representation of an electrode formed using the plant of FIG. 1; and FIG. 3 shows a schematic representation of an electrode after it has been cast but before it has been rolled.

DESCRIPTION OF PREFERRED EMBODIMENTS

An embodiment will be described with reference to the forming of lead alloy anodes but it will be appreciated that the methodology could be used with other metal or metal alloy electrodes such as the forming of aluminium cathodes to name but one example.

Referring to the accompanying Figures, a metal or metal alloy is passed into a melting pot 10.

The melting, pot is heated to a temperature range for example between 300° C. and 600° C., depending on the alloy, and the alloy is melted.

A second metal such as a copper bar, for example, is placed into a mould 12. Copper is used worldwide and is the preferred metal. The length shape and thickness of the copper hanger bar is determined by the weight and size of the anode to be formed.

Under the force of gravity melted lead alloy passes from the melting pot through connecting pipe 14 into the bottom of the mould 12, rising up and covering the copper bar.

Because the melted lead alloy is gravity fed from the bottom of the mould, this helps eliminate air pockets and impurities floating on the matter metal.

Once the metal has cooled sufficiently, it is placed in a cooling tank 16, if necessary.

Certain alloys do not require cooling in which case the cooling tank 16 will not be used.

The metal is moved from the mould 12 to the cooling tank 16 using an overhead crawl beam and hook contraption 18.

Thus the first step of casting the metal or the metal alloy in the mould is complete and the metal is now moved to a mould 20 in the form of a horizontal mould.

After the anode has been cast but before it is rolled its shape is as depicted in FIG. 3 with the thickness of the blade 32 being a thickness "A".

The mould typically includes guide rollers 22 and compression rollers 24 which have a flywheel compression drive 26. As the cast metal passes through the horizontal rollers the cast metal is rolled and the shape of the cast metal changes.

If required, the electrode can be rolled and cross-rolled to spread in the molecules evenly.

After rolling the width of the blade 32 is as shown in FIG. 2 with thickness "B" and "C" being less than the thickness "A" in FIG. 3.

The thickness of the casting before rolling will be ascertained by the required finished thickness and will typically need to be compressed by between about 30% and 70% depending on the alloy in use. In the illustrated embodiment this amounted to about 3 mm.

In any event, the compression rollers 24 typically start in a more open position to allow the part of the electrode with the copper insert to pass through towards the pit 28.

Once the copper portion has passed through to a predetermined position, the compression rollers begin closing to compress the portion of the metal or metal alloy behind the copper portion.

In this manner, the copper header bar 30 and blade 32 are integrally formed without requiring the welding of the header to the blade.

The header is typically not rolled at all since it is not immersed in the solution and is not subject to corrosion.

The electrode is then trimmed and fettled ready for dispatch.

It will be appreciated that where the electrode corrodes quicker at solution level, the electrode can be rolled thicker from the header to approximately 30 mm below the solution level while the remainder of the blade can be rolled as required. An example of this can be seen in FIG. 2.

Thus the electrode will have three different thicknesses. One example of these different thicknesses is illustrated in the accompanying drawing.

In any event, the method is suitable for any metal or metal alloy electrode and will give required electrical conductivity and mechanical strength of rolled metal or metal alloy but with a simpler and less costly manufacturing process than previous designs.

In addition, the methodology allows existing lead anodes to be recast and rolled to provide the improved structure.

The invention claimed is:

1. An electrode, comprising:
   a cast header portion; and
   a rolled blade portion integrally formed with the header portion, wherein the blade portion has at least two different thicknesses, wherein
   the header portion and the blade portion are formed integrally by casting a molten metal in a mold to form the header portion and the blade portion, and rolling the blade portion after the blade portion has been cast to evenly distribute molecules on a surface of the blade portion and impart a rolled grain structure to the molecules.

2. An electrode according to claim 1 wherein the electrode is formed from lead or lead alloy.

3. An electrode according to claim 2 wherein the electrode is a lead or lead alloy anode.

4. An electrode comprising:
   a cast header portion;
   a rolled blade portion integrally formed with the header portion, wherein
   the header portion and the blade portion are formed integrally by casting a molten metal in a mold to form the header portion and the blade portion, and rolling the blade portion after the blade portion has been cast to evenly distribute molecules on a surface of the blade portion and impart a rolled grain structure to the molecules; and
   a metal molded with the electrode.

5. An electrode according to claim 4 wherein the metal molded with the electrode is copper.

6. An electrode according to claim 4 wherein the electrode is formed from lead or lead alloy.

7. An electrode according to claim 6 wherein the electrode is a lead or lead alloy anode.

* * * * *